No. 612,914. Patented Oct. 25, 1898.
H. C. SCHMIDT.
COCK.
(Application filed Oct. 26, 1897.)
(No Model.)
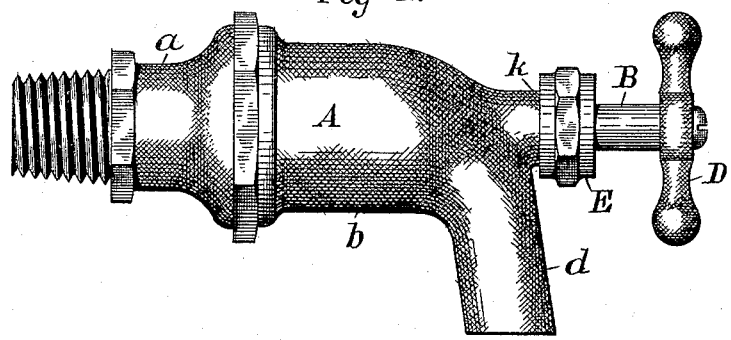
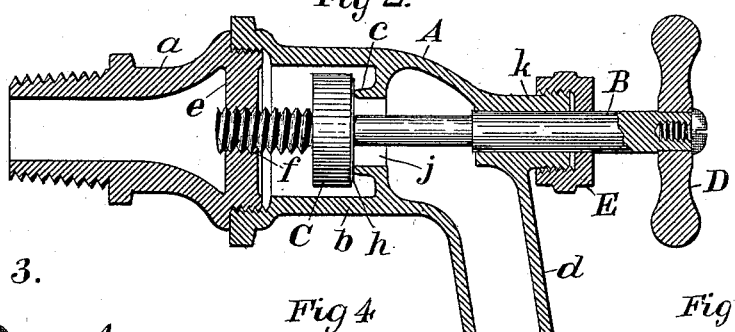
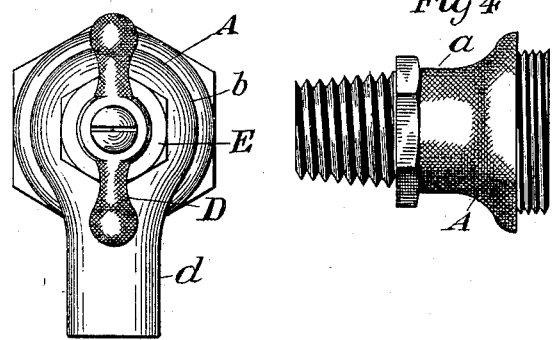
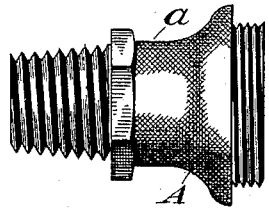
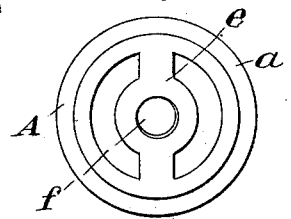
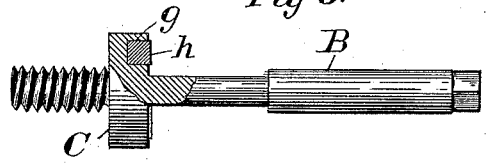
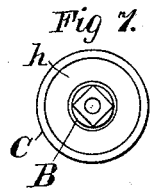
WITNESSES —
Dan'l Fisher
H. Constantine
— INVENTOR —
Henry Chatard Schmidt,
by G. & W. J. Howard,
Atty.
THE NORRIS PETERS CO., PHOTO-LITHO., WASHINGTON, D. C.

UNITED STATES PATENT OFFICE.

HENRY CHATARD SCHMIDT, OF BALTIMORE, MARYLAND.

COCK.

SPECIFICATION forming part of Letters Patent No. 612,914, dated October 25, 1898.

Application filed October 26, 1897. Serial No. 656,409. (No model.)

*To all whom it may concern:*

Be it known that I, HENRY CHATARD SCHMIDT, of the city of Baltimore and State of Maryland, have invented certain Improvements in Cocks, of which the following is a specification.

This invention relates to certain improvements in what are termed "compression-cocks," and particularly to cocks in that class in which the valve closes in the direction of the flow of water in contradistinction to those in which the valve is seated against the pressure of water from the service-pipe; and the said invention consists in the constructions and combinations set forth in the claim.

In the further description of the said invention which follows reference is made to the accompanying drawings, forming a part hereof, and in which—

Figure 1 is an exterior side view of the improved cock. Fig. 2 is a longitudinal side section of the same. Fig. 3 is a view of Fig. 1 as seen from the front. Figs. 4, 5, 6, and 7 are details of the improved cock.

Referring now to the drawings, A is the shell of the cock, consisting of two principal parts *a* and *b*, the former having a threaded end whereby it is attachable to the service water-pipe, and the latter, which is screwed over the part *a*, having a raised valve-seat *c* and the turned-down discharge-nozzle *d*.

At the inner end of the part *a* of the shell A is a bridge-piece *e*, in the center of which is a threaded hole *f* for the valve-stem B.

Integral with the stem B is the valve C, which consists of a circular disk having an annular recess *g*, into which is forced the annular compressible gasket *h*. This gasket forms the face of the valve, which in the closing operation is brought into contact with the raised seat *c*.

The waterway *j* is of such diameter that the space around the stem is sufficient when the valve is open to allow of the free discharge of water to the turned-down nozzle *d*.

At the junction of the delivery-nozzle and the part *b* of the shell A is an exteriorly-threaded boss *k*, through which the valve-stem B passes, and the said stem is provided with a handle D, whereby it is turned to open and close the valve.

The threaded boss *k* has a screw-gland E, between the inner surface of which and the outer surface of the boss may be placed a compressible washer to prevent escape of water around the stem.

The thread on the valve-stem is preferably what is termed a "left-hand" thread, in order that in turning the handle in the direction taken to release a screw the valve is opened, and vice versa.

I claim as my invention—

In a compression-cock, the shell thereof composed of two parts screwed together, one part having a waterway and an interiorly-threaded bridge at a right angle with the waterway, and the other provided with a discharge-nozzle, and a waterway in alinement with the first waterway, the latter waterway being surrounded by a raised valve-seat, combined with a stem one end of which is threaded so as to screw into the threaded bridge, and the other which passes through a smooth or unthreaded aperture in the shell provided with a handle, and a valve integral with the stem, which consists of a flat-faced circular disk with an annular recess for a joint-forming gasket, the said valve being situated between the raised valve-seat and the threaded bridge, substantially as specified.

HENRY CHATARD SCHMIDT.

Witnesses:
 WM. T. HOWARD,
 DANL. FISHER.